(12) United States Patent
Wieduwilt

(10) Patent No.: US 9,399,330 B2
(45) Date of Patent: Jul. 26, 2016

(54) ULTRASONIC JOINING METHOD AND ULTRASONIC JOINING DEVICE

(71) Applicant: Robert Bosch GmbH, Stuttgart (DE)

(72) Inventor: Ulrich Wieduwilt, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/561,456

(22) Filed: Dec. 5, 2014

(65) Prior Publication Data
US 2015/0165718 A1 Jun. 18, 2015

(30) Foreign Application Priority Data
Dec. 12, 2013 (DE) .......................... 10 2013 225 743

(51) Int. Cl.
| | | |
|---|---|---|
| *B32B 37/00* | (2006.01) | |
| *B31B 1/00* | (2006.01) | |
| *B31F 5/00* | (2006.01) | |
| *B29C 65/08* | (2006.01) | |
| *B29C 65/00* | (2006.01) | |

(52) U.S. Cl.
CPC . *B31B 1/00* (2013.01); *B31F 5/008* (2013.01); *B29C 65/08* (2013.01); *B29C 65/081* (2013.01); *B29C 66/0016* (2013.01); *B29C 66/1122* (2013.01); *B29C 66/43* (2013.01); *B29C 66/72328* (2013.01); *B29C 66/8322* (2013.01); *B31B 2201/603* (2013.01); *B31B 2201/61* (2013.01); *B31B 2203/00* (2013.01)

(58) Field of Classification Search
CPC ....... B31F 5/008; B29C 65/08; B29C 65/081; B65B 51/225
USPC .................... 156/73.1, 580.1, 580.2
See application file for complete search history.

(56) References Cited

U.S. PATENT DOCUMENTS

| | | | | |
|---|---|---|---|---|
| 4,605,454 | A * | 8/1986 | Sayovitz ............... | B29C 65/086 156/308.8 |
| 7,220,331 | B2 * | 5/2007 | Gmeiner ............... | B29C 65/086 156/210 |
| 2005/0016690 | A1 | 1/2005 | Gmeiner | |
| 2013/0112332 | A1 * | 5/2013 | Spicer ................... | B23K 20/10 156/64 |

FOREIGN PATENT DOCUMENTS

| | | |
|---|---|---|
| EP | 0340334 | 11/1989 |
| WO | 03043807 | 5/2003 |

* cited by examiner

*Primary Examiner* — James Sells
(74) *Attorney, Agent, or Firm* — Michael Best & Friedrich LLP

(57) ABSTRACT

An ultrasonic joining method for connecting paper material (5), in particular paper, board or paperboard, comprising the following steps: introducing the paper material (5) into a gap (4) between a sonotrode (2) and an anvil (3), causing the sonotrode (2) to oscillate ultrasonically for the ultrasonic welding of the paper material (5), the paper material (5) being moistened with demineralized water (9), preferably on inner sides of joining points, before and/or during the ultrasonic welding.

20 Claims, 5 Drawing Sheets

ULTRASONIC JOINING METHOD AND ULTRASONIC JOINING DEVICE

BACKGROUND OF THE INVENTION

The present invention relates to an ultrasonic joining method and an ultrasonic joining device for connecting paper material, in particular paper, board or paperboard.

WO03/043807 shows a device for connecting a multilayer material web by means of ultrasound. Here, a large-area and continuous connection of individual layers of the material web is made. For instance, corrugated board is produced.

EP 0 340 334 A2 describes a device which is suitable for connecting two-layer or multilayer paper products by means of ultrasound. The paper used here is provided with a thermoplastic coating. By means of the sonotrode, longitudinal waves are generated, so that the sonotrode moves toward the anvil and away from the anvil again during the ultrasonic oscillation. By means of the appropriate ultrasonic frequency and the appropriate contact pressure, adequate compaction of the paper layers is produced here. At the same time, there is a high development of heat in the micro-region of the thermoplastic coating, and thus adhesive bonding of the paper layers occurs.

The appended FIG. 7 shows, in a schematically simplified view, an ultrasonic joining device 100 according to the prior art for connecting thermoplastically coated paper material. The device 100 comprises a sonotrode 102 according to the prior art and an anvil 103 according to the prior art. The paper material 5 to be joined is located between the sonotrode 102 and the anvil 103. In the gap between the sonotrode 102 and the anvil 103, a joining force 106 is applied to the paper material 5. The sonotrode 102 executes an ultrasonic oscillation with an oscillation direction 107. In the device 100 according to the prior art, the oscillation direction 107 and the direction of the joining force 106 are oriented parallel to each other. Here, therefore, the longitudinal direction of movement of the sonotrode 102 is used for the joining process.

SUMMARY OF THE INVENTION

According to the invention, for the ultrasonic joining of paper material, demineralized water is used for moistening the joining points. The decisive advantage in using demineralized water, as opposed to conventional water, resides in the considerably reduced surface tension of the moistening agent. This leads to the joining points being able to be wetted better and more uniformly and water being able to penetrate more quickly. This constitutes a decisive advantage, in particular in time-critical processing processes. These advantages are achieved by an ultrasonic joining method according to the invention for connecting paper material, in particular paper, board or paperboard, comprising the following steps: i) introducing the paper material into a gap between a sonotrode and an anvil; (ii) causing the sonotrode to oscillate ultrasonically for the ultrasonic welding of the paper material. Here, the paper material is moistened with demineralized water, preferably on the inner sides of joining points, before and/or during the ultrasonic welding. It is assumed that, as a result of the ultrasonic welding at the joining points, the paper structure is slightly broken down and thus a local paper pulp is formed. As a result of the action of the ultrasound and of the pressure from the joining force, this paper pulp permits felting and thus a type of gluing of the paper fibers, in a manner analogous to paper production. A type of compaction of the joining surfaces leads to the formation of hydrogen bridges. This is often also described as felting. The local formation of hydrogen bridges can be assisted actively by the moistening. As a result of the moistening with demineralized water, the glass transition temperature of the paper polymers is reduced sharply and thus combustion phenomena at the joining point are prevented. The moisture in the fiber composite increases the evaporation characteristic, which means that the action of the ultrasound is increased.

Provision is preferably made for the paper material to be moistened with water vapor. Demineralized water vapor is produced as a result of heating water. This is preferably used here for moistening the paper material. This ensures that the surface tension of the moistening agent is considerably lower than that of the paper material, in order thus to be able to ensure good wetting. As opposed to liquid water, the water vapor has a higher energy level and a lower surface tension. The surface tension of water normally lies around 73 mN/m at 20° C., whereas water vapor at 80° C. has a surface tension of only about 63 mN/m. The surface tension is the reason for the behavior of liquids to form energetically beneficial ball-like droplets with the smallest possible surface. This results in the distribution of the moisture proceeding considerably more finely and homogeneously when water vapor is used than, for example, in the case of application with a sponge or similar aids.

Thus, provision is preferably further made for water vapor with a temperature of at least 80° C. to be used for the method.

If liquid water is used for the ultrasonic joining method instead of water vapor, provision is preferably made for this water to have a temperature of at least 50° C. during the moistening of the paper material.

Furthermore, provision is preferably made for water with a conductivity of at most 100 µS/cm (micro-Siemens per cm), preferably at most 50 µS/cm, particularly preferably at most 20 µS/cm, to be used for the moistening. The conductivity indicates the level of demineralization of the water. The more intensely the water is demineralized, the lower is the conductivity and the better the water is suited for wetting the joining points.

Preferably, ultrasonic friction welding is used to connect the paper material. The ultrasonic oscillation generated by the sonotrode has a specific oscillation direction for this purpose. At the same time as the application of the ultrasonic oscillation by the sonotrode, a joining force is applied to the paper material in the gap between the sonotrode and the opposite anvil. This joining force is oriented in a joining force direction. Provision is preferably made for the oscillation direction and the joining force direction not to be oriented parallel to each other. In the prior art, the oscillation direction of the sonotrode is always designed to be parallel to the joining force direction. As a result, in the prior art, it is primarily the longitudinal direction of movement of the oscillating particles that is used for the generation of energy in the joint. In the process, the thermal energy is generated from internal molecular and interface friction of the joining partners. The thermal energy from the interface friction is obtained here from the deformation energy of the deformation of the joining material over the anvil geometry. By contrast, within the context of the invention, it has been detected that very much better joining of paper material is possible if use is made of a frictional welding method in which, primarily, the interface friction is used. Provision is therefore preferably made to carry out ultrasonic friction welding which is defined by the fact that the joining force direction is not parallel to the oscillation direction of the ultrasonic oscillation.

As compared with conventional ultrasonic joining methods in which the joining force direction is oriented parallel to the oscillation direction of the sonotrode, ultrasonic friction welding has diverse advantages. During ultrasonic friction welding, materials with low sound damping can be used, which is the case in particular in paper material. Because of the frictional movement of the joined paper materials, no emission of sound, such as that which results from the hammering movements of the sonotrode in the longitudinal ultrasonic welding method, can be detected. In the method according to the invention, the shear and peeling strength of the joint connection is considerably higher than in the case of joint connections which have been produced with conventional ultrasonic joining methods. A further critical advantage in the case of the method of the invention is that, for the input of energy into the paper material, all of the oscillation is used and not just the amplitude which acts in the direction of the joining point. As a result of avoiding any hammering movement onto the paper material to be joined, this paper material is treated carefully as it passes through the ultrasonic joining method according to the invention.

In particular, provision is made for the joining force direction to be perpendicular or at right angles to the oscillation direction. Deviations of ±10° are still viewed as perpendicular here. As a result of this orientation, it is ensured that the amplitudes of the oscillating sonotrode act on the paper material to the greatest possible extent in both directions. At the same time, the perpendicular orientation of the joining force direction with respect to the oscillation direction ensures approximately exclusive utilization of the interface friction at the joining points.

The ultrasonic oscillation frequency of the sonotrode is preferably 10 to 80 kHz, particularly preferably between 20 and 70 kHz. Furthermore, provision is preferably made for the ultrasonic oscillation amplitude of the sonotrode preferably to lie between 10 and 50 μm, particularly preferably between 20 and 40 μm. In particular, given these parameters for the ultrasonic oscillation, interface friction at the joining points that is beneficial to the joining of the paper material is produced.

The method according to the invention leads to very stable joining points, so that the use of adhesive or thermoplastic coatings is preferably dispensed with. Furthermore, it is not necessary either for there to be printer ink on the paper material at the joining points, which would benefit adhesive bonding of the paper materials in the manner similar to a thermoplastic coating.

The invention further comprises a method for producing a package made of paper material, in particular paper, board or paperboard. In this method for producing the package, the ultrasonic joining method as has just been described is used. Advantageous refinements presented within the context of the ultrasonic joining method can be applied correspondingly advantageously to the method for producing the package.

In particular in the packaging industry, numerous types of adhesive bonding connections of cartons with the aid of adhesive emulsions (cold glue) and hot-melt adhesives (hot glue) are used. In order to rationalize the packaging process and to make the same cleaner and more hygienic, the method according to the present invention can be used. As a result of the short cycles in the range from 0.1 to 1 second and holding times from 0.1 to 2 seconds, the ultrasonic joining method according to the invention is particularly suitable for use in mass production for high numbers. As compared with the adhesive bonding method, the ultrasonic joining method according to the invention has the following advantages: according to the invention, no joining material is needed, so that hot and cold glue can be substituted. The paper material needs no additional thermoplastic coating for the joining operation by means of ultrasound. Conventional gluing machines have a high tendency to soiling. Since, in the method according to the invention, no additives are preferably used, with the exception of the use of water for moistening, a reduction in the soiling and thus the maintenance of the hygienic standards which are of high importance for the foodstuffs and pharmaceutical industry can be achieved. The result of this is also that, in the method according to the invention, there is no risk of migration of joining material (glue) into the packaged material. Furthermore, the result is great savings in energy, since no continuous heating of the hot glue is necessary. The energy needed for the ultrasonic joining method is needed only in the region of the joining time, that is to say in the millisecond range.

The invention further comprises an ultrasonic joining device for connecting paper material, in particular paper, board or paperboard. The ultrasonic joining device comprises a sonotrode that can be caused to oscillate ultrasonically, and an anvil. The paper material can be welded ultrasonically in a gap between the sonotrode and the anvil by the ultrasonic oscillation of the sonotrode. Furthermore, a moistening device for moistening the paper material is provided. This moistening device operates with demineralized water and preferably applies the latter to inner sides of joining points. The moistening is carried out before and/or during the ultrasonic welding.

Advantageous refinements presented within the context of the ultrasonic joining method according to the invention can be applied correspondingly advantageously to the ultrasonic joining device according to the invention.

BRIEF DESCRIPTION OF THE DRAWINGS

Two exemplary embodiments of the invention will be described in detail below with reference to the accompanying drawing, in which.

DETAILED DESCRIPTION

Figure 1:
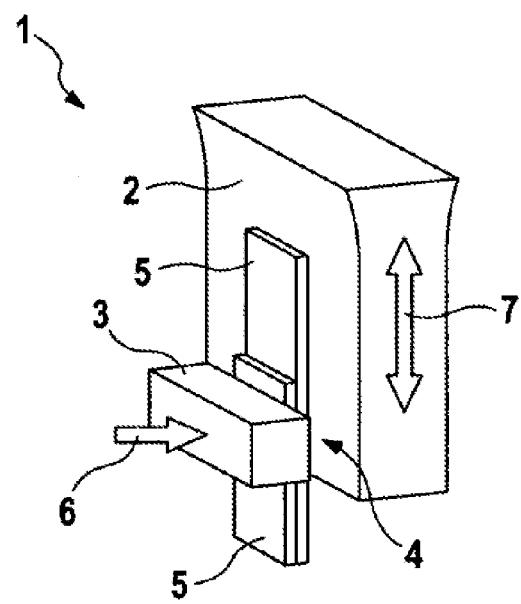
FIG. 1 shows a schematically simplified illustration of an ultrasonic joining device according to the invention for carrying out the ultrasonic joining method according to the invention, according to a first exemplary embodiment.

FIG. 1 shows, in a highly schematically simplified view, an ultrasonic joining device 1 according to the first exemplary embodiment. By using this ultrasonic joining device 1, the ultrasonic joining method according to the invention can be carried out.

The ultrasonic joining device 1 comprises a sonotrode 2 and an anvil 3. A gap 4 is formed between the sonotrode 2 and the anvil 3. The paper material 5 to be joined is located in this gap 4. Two joining partners, which overlap within the gap 4, are shown. These two joining partners are connected to each other by means of the ultrasonic joining device 1.

Via the anvil 3, a joining force acts on the paper material 5 in the gap 4. This joining force is oriented in a joining force direction 6.

The sonotrode 2 is excited to carry out an ultrasonic oscillation in oscillation direction 7. This oscillation direction 7 corresponds to the expansion direction of the amplitudes of the ultrasonic oscillation.

As can be gathered easily from FIG. 1, the joining force direction 6 is perpendicular to (also: at right angles to) the oscillation direction 7. Thus, this is an ultrasonic friction welding method.

Figure 2:
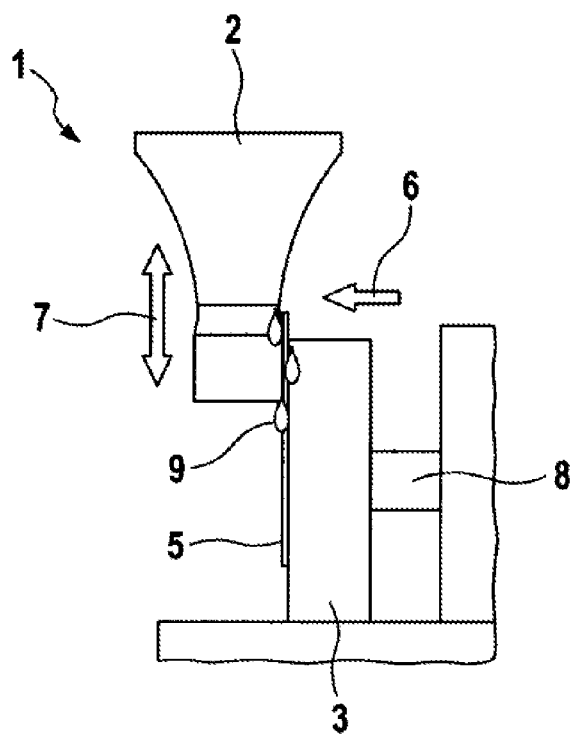
FIG. 2 shows a detail view from FIG. 1.

FIG. 2 shows a detail view from FIG. 1, likewise schematically simplified. According to FIG. 2, the anvil 3 is loaded via a cylinder rod 8, so that the anvil 3 is able to exert the joining force on the paper material 5 in the gap 4. Accordingly, the cylinder rod 8 is also arranged parallel to the joining force direction 6.

Furthermore, FIG. 2 shows, in a schematically highly simplified manner, the possible way of moistening the paper material 5 with water 9. As already described, this moistening benefits the joining process.

Figure 3:
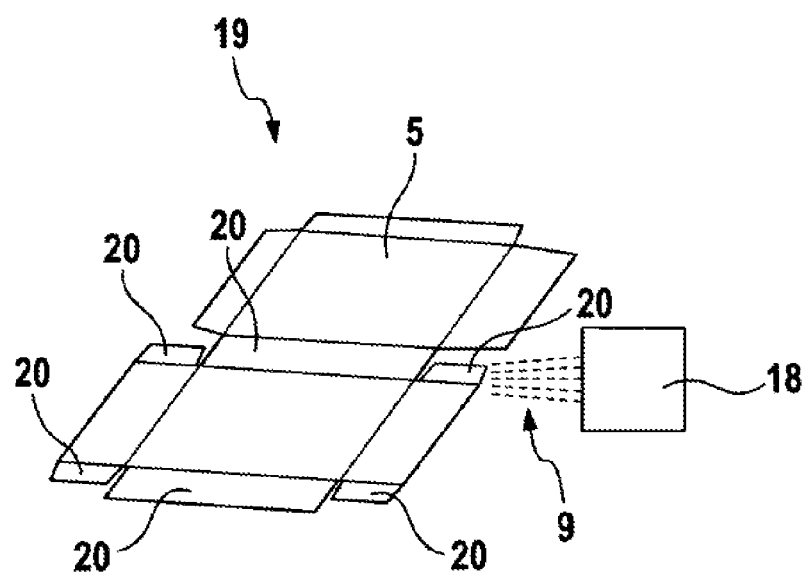
FIG. 3 shows a schematically simplified illustration of a moistening device of the ultrasonic joining device according to the invention, according to the first exemplary embodiment.

FIG. 3 shows a blank 19 made of paper material 5. A package, for example a box, can be shaped from this blank 19 in an appropriate packaging machine. The ultrasonic joining device 1 is integrated in such a packaging machine, for example, so that the method according to the invention can be carried out in the packaging machine.

The blank 19 has a plurality of tabs 20. As the blank 19 is folded, respectively two of the tabs 20 overlap and thus form the joining points. Before and/or during the ultrasonic friction welding, the tabs 20 are moistened by means of the moistening device 18 illustrated. The moistening device 18 applies demineralized water to the joining points, either in liquid or in vaporous form.

The illustration in FIG. 3 is to be understood purely schematically.

Figure 4:
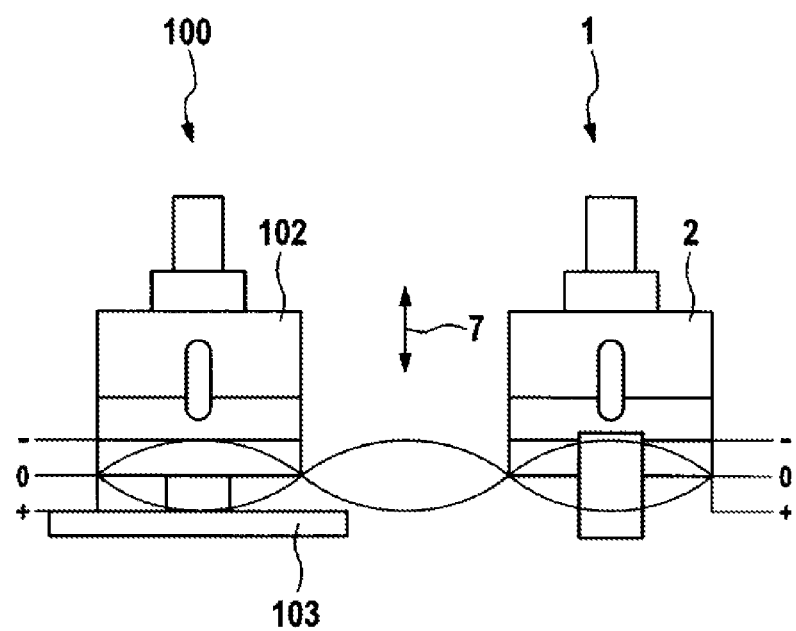
FIG. 4 shows a comparison of a conventional ultrasonic joining method with the ultrasonic joining method according to the invention.
Figure 7:
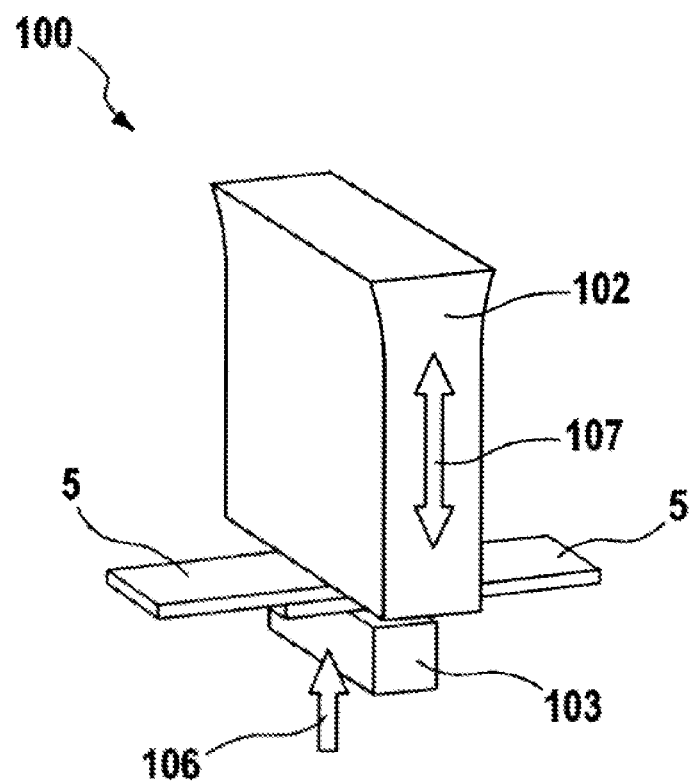
FIG. 7 shows an ultrasonic joining device according to the prior art.

FIG. 4 shows, on the left-hand side, the principle of conventional longitudinal ultrasonic welding, such as can be carried out, for example, by using the device 100 according to the prior art in FIG. 7. The amplitude of the ultrasonic oscillation is not shown to scale, in order to illustrate the functional principle. The amplitude amounts to between 20 and 40 µm, for example. On the right-hand side in FIG. 4, the principle of the preferred ultrasonic joining device 1 is illustrated. In this illustration, it can be seen that, in the prior art, only the lower, positive amplitude is able to develop any action in the direction of the paper material 5. In the case of the preferred principle of the ultrasonic friction welding, on the other hand, lateral pressing of the paper material 5 onto the sonotrode takes place, as shown in FIGS. 1 and 2. As a result, both amplitude directions, that is to say the expansion in the positive amplitude direction and the contraction or withdrawal in the negative amplitude direction, can be used effectively for the joining process.

Figure 5:
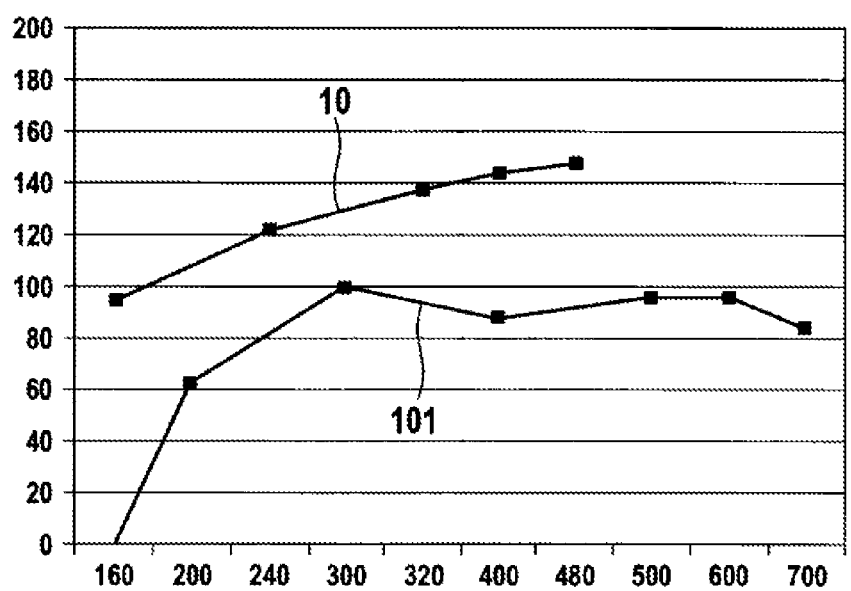
FIG. 5 shows a graph relating to the tensile strength of the joining point produced.

FIG. 5 shows, in a graph, the trial results in which a board of 300 g/m$^2$ was tested in accordance with the invention in a device 100 according to the prior art and with an ultrasonic joining device 1 according to the invention. The applied joining force in [N] is plotted on the horizontal axis. The vertical axis shows the tensile strength produced of the joining point in [N/15 mm]. An upper curve 10 shows the result of the ultrasonic joining method according to the invention. A lower curve 101 shows the result when the device 100 according to the prior art is used.

Within the context of the invention and in experimental investigations, it has been shown that paper, board and paperboard can be connected better to each other if, according to the invention, moistening of the joining points with demineralized water and preferably also ultrasonic friction welding is used as joining method. As opposed to conventional ultrasonic welding, here the oscillation direction 7 is not parallel to the joining force direction 6 but preferably perpendicular (also: at right angles) thereto. The strength values of the connection in relation to the shear and peeling strength are increased considerably as compared with the longitudinal ultrasonic welding method. In addition, as FIG. 5 shows, relatively high tensile strengths can be achieved even in the region of low joining forces.

On the basis of trials that have been carried out, it is assumed that not only the micro-splicing of the fibers and new hydrogen bridges are decisive for the connection with a high relative tensile strength. The results argue in favor of plasticization and solidification of fiber-related polymers, natural or synthetic binders and polymer-like additives. It is possible to assume that, during the joining process, plasticized areas will be found on the mutually touching surfaces. The conventional longitudinal ultrasonic joining operation acts on the joining partners with an increased depth action. In order to improve the joining quality, it is more effective to have the mechanical loading act parallel to the joining plane, as has been shown within the context of the present invention. A further substantial advantage which argues in favor of the lateral pressing of the sonotrode 2 onto the paper material 5 is the complete utilization of the sonotrode oscillations in both amplitude directions. In the case of the preferred ultrasonic friction welding, both the expansion and the contraction movement of the standing wave generated in the oscillating structure are utilized. If the sonotrode is pressed against the joining partners in conventional longitudinal ultrasonic welding, only the expansion acts on the welding operation; during the contraction the sonotrode 102 loses contact with the paper material 5. Thus, in the preferred ultrasonic joining method, a doubling of the effective amplitude can be achieved, for example from 24 µm to 48 µm at 30 kHz.

Figure 6:
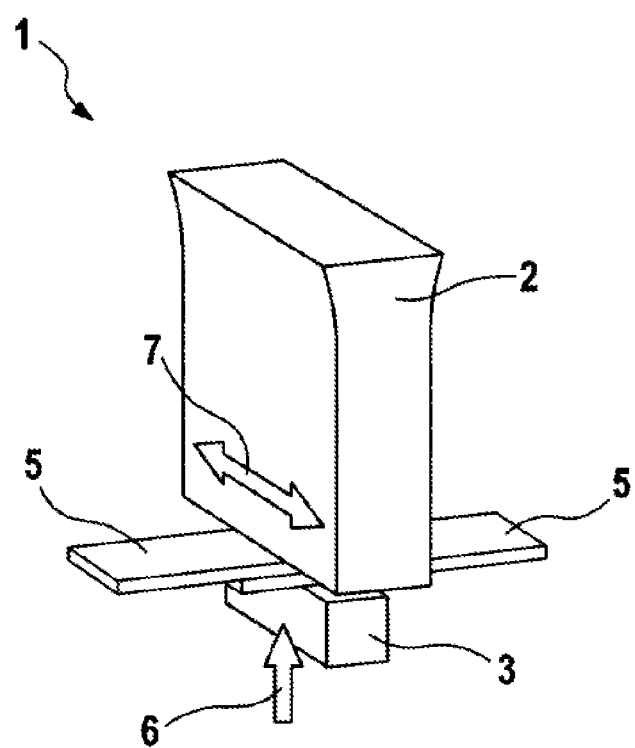
FIG. 6 shows a schematically simplified illustration of the ultrasonic joining device according to the invention for carrying out the ultrasonic joining method according to the invention, according to a second exemplary embodiment.

FIG. 6 shows, in a highly schematically simplified view, an ultrasonic joining device 1 according to the second exemplary embodiment. By using this ultrasonic joining device 1, the ultrasonic joining method according to the invention can be carried out. Identical and functionally identical components are provided with the same designations in both exemplary embodiments.

In the second exemplary embodiment, the sonotrode 2 oscillates horizontally and parallel to the joining surfaces. The oscillation direction 7 is consequently also oriented horizontally. The joining force direction 6 is oriented vertically and thus at right angles to the oscillation direction 7. The moistening device 18 according to FIG. 3 is likewise used here.

What is claimed is:

1. An ultrasonic joining method for connecting paper material (5), comprising the following steps:
    introducing the paper material (5) into a gap (4) between a sonotrode (2) and an anvil (3), and
    causing the sonotrode (2) to oscillate ultrasonically for the ultrasonic welding of the paper material (5),
    wherein the paper material (5) is moistened with demineralized water (9) during the ultrasonic welding.

2. The ultrasonic joining method according to claim 1, characterized in that the paper material (5) is moistened with water vapor.

3. The ultrasonic joining method according to claim 2, characterized in that the water vapor has a temperature of at least 80° C. during the moistening of the paper material (5).

4. The ultrasonic joining method according to claim 1, characterized in that the paper material (5) is moistened with liquid water (9), the water having a temperature of 50° C. during the moistening of the paper material (5).

5. The ultrasonic joining method according to claim 1, characterized in that water (9) with a conductivity of at most 100 μS/cm is used for the moistening.

6. The ultrasonic joining method according to claim 1, characterized in that water (9) with a conductivity of at most 50 μS/cm is used for the moistening.

7. The ultrasonic joining method according to claim 1, characterized in that water (9) with a conductivity of at most 20 μS/cm, is used for the moistening.

8. The ultrasonic joining method according to claim 1, characterized in that a joining force is applied to the paper material (5) in the gap (4) in a joining force direction (6), ultrasonic friction welding being carried out in which the joining force direction (6) is not parallel to an oscillation direction (7) of the ultrasonic oscillation.

9. The ultrasonic joining method according to claim 1, characterized in that the joining force direction (6) is perpendicular to an oscillation direction (7), with a maximum deviation of +/−10°.

10. The ultrasonic joining method according to claim 1, characterized in that no adhesive and no thermoplastic is used for the ultrasonic joining of the paper material (5).

11. The ultrasonic joining method according to claim 1, characterized in that no adhesive, no thermoplastic and no printing ink is used for the ultrasonic joining of the paper material (5).

12. The ultrasonic joining method according to claim 1, wherein the paper material (5) is moistened with demineralized water (9) on inner sides of joining points.

13. A method for producing a package made of paper material (5), the method comprising an ultrasonic joining method according to claim 1.

14. An ultrasonic joining device (1) for connecting paper material (5), comprising
a sonotrode (2) configured to oscillate ultrasonically, and
an anvil (3), with a gap between the sonotrode and the anvil,
the ultrasonic joining device being configured to weld the paper material (5) in the gap (4) by ultrasonic oscillation of the sonotrode (2),
and further comprising a moistening device (18) for moistening the paper material (5) with demineralized water (9) during ultrasonic welding of the paper material.

15. The ultrasonic joining device according to claim 14, wherein the paper material (5) is moistened with demineralized water (9) on inner sides of joining points.

16. The ultrasonic joining method according to claim 1, wherein the paper material (5) is also moistened with water before ultrasonic welding of the paper material.

17. The ultrasonic joining device according to claim 14, wherein the moistening device (18) also moistens the paper material (5) with water before ultrasonic welding of the paper material.

18. The ultrasonic joining method according to claim 1, wherein the gap (4) is formed between a flat surface of the ultrasonic horn (2) and a flat surface of the anvil (3), and wherein the flat surface of the ultrasonic horn (2) and the flat surface of the anvil (3) are parallel to the direction of vibration (7).

19. The ultrasonic joining method according to claim 8, wherein the joining force is applied with the anvil (3).

20. The ultrasonic joining device (1) according to claim 14, wherein the gap (4) is formed between a flat surface of the sonotrode (2) and a flat surface of the anvil (3), wherein the flat surface of the sonotrode (2) and the flat surface of the anvil (3) are parallel to an oscillation direction (7) of the ultrasonic oscillation, and wherein the anvil (3) is configured to be moved in a direction of the sonotrode (2) in order to generate a joining force (6).

* * * * *